United States Patent [19]
Findlay et al.

[11] Patent Number: 5,176,239
[45] Date of Patent: Jan. 5, 1993

[54] ADVERTISING FITTING

[75] Inventors: Alexander Findlay; Mark Bartlett, both of Auckland, New Zealand

[73] Assignee: Escalator Advertising Limited, Auckland, New Zealand

[21] Appl. No.: 767,835

[22] Filed: Sep. 30, 1991

[30] Foreign Application Priority Data

Jun. 13, 1991 [NZ] New Zealand ............... 238537

[51] Int. Cl.⁵ ............................................ B66B 23/12
[52] U.S. Cl. ........................................ 198/321; 198/333
[58] Field of Search .................... 198/321, 333, 337

[56] References Cited

U.S. PATENT DOCUMENTS 3,982,625  9/1976  Wentz et al. ............... 198/577 X
4,979,591  12/1990  Habegger et al. ........... 198/502.1 X

FOREIGN PATENT DOCUMENTS

625696  12/1962  Belgium ........................ 198/337
2161442  7/1972  Fed. Rep. of Germany ...... 198/333
2750226  5/1978  Fed. Rep. of Germany ...... 198/337

Primary Examiner—D. Glenn Dayoan
Attorney, Agent, or Firm—Young & Thompson

[57] ABSTRACT

An escalator or travelator is provided with a plurality of advertising signs on the riser or step of the escalator or travelator. The sign is provided with a transparent cover which is positioned on the step so as to not interfere with the relative movement of adjacent steps on the escalator/travelator or the cyclic movement of the escalator/travelator itself.

6 Claims, 9 Drawing Sheets

ADVERTISING FITTING

FIELD OF THE INVENTION

This invention relates to the field of advertising, and more particularly to means for providing indicia on an escalator or travelator.

BACKGROUND

An escalator is a continuously acting passenger conveying device which has about 10 times the hourly handling capacity of a lift, being able to convey passengers at a speed of about two meters per second. The escalator comprises an arrangement of steps attached to two endless chains which run on sprocket wheels at the top and bottom of the escalator. As a result of this arrangement, the steps gradually merge into a flat horizontal surface at the top of the escalator and move through a comb-like device (comb), enabling the passengers to step off easily, and similarly, convenient stepping-on is ensured at the bottom of the upward moving escalator.

Escalators are a convenient form of transport within multi-level buildings such as department stores, supermarkets, airports and buildings in which some but not all of the floors contain retail outlets. A common difficulty experienced by retailers who are not on the street level of a multi-level building, is that of attracting consumer attention to their shops. At present there appears to be a limited number of ways in which the retailer can inform the potential customer of his/her whereabouts in the building, however under these circumstances, it is very difficult for the retailer to use advertising which is both economical and effective. Consequently there is a need to provide a better means of advertising for retailers in multi-level buildings, which the present invention in its preferred form is intended to go at least part way towards meeting.

OBJECT

It is an object of the present invention to go at least part way towards providing novel or improved means for advertising on an escalator or travelator, or at least to provide the public with a useful choice.

SUMMARY OF THE INVENTION

According to the present invention there is provided a passenger conveying device such as an escalator or travelator having a plurality of interacting movable steps, each said step having a defined external profile allowing relative movement between adjacent steps, wherein at least one of said steps has means for displaying indicia to a passenger on said device, said means comprising a cover fixed to said step, said cover having an external profile corresponding to the defined external profile of said steps.

BRIEF DESCRIPTION OF THE DRAWINGS

The following is a description of preferred forms of the present invention, given by way of example only, with reference to the accompanying drawings, in which.

For the purposes of this description, a typical escalator step will be described, however it will be apparent that a travelator is a similar apparatus to an escalator, having a tread portion but not a riser portion, and will be described under the heading VARIATIONS.

DESCRIPTION OF THE PREFERRED EMBODIMENTS

Figure 1:
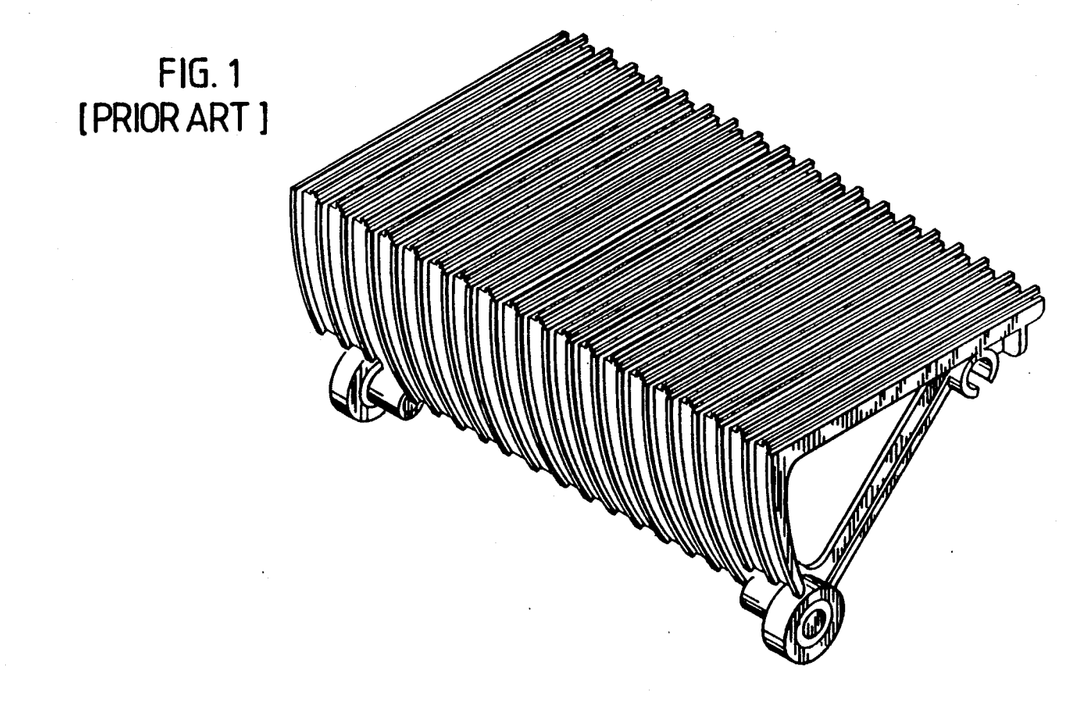
FIG. 1 illustrates a typical step used in an escalator showing a tread and a riser, both with castellated surfaces, and castors for use on escalator rails.

FIG. 1 illustrates an isometric view of a typical escalator step, which includes a tread 10 having a castellated surface 15 made up of a number of ribs, some of which extend at the rear of the tread to form teeth 20. The front face of the step is normally called the riser 25, and on most modern escalators the riser also has a castellated surface incorporating a number of ribs 30. FIG. 1 shows that the castellations on the riser complement the teeth on the rear of the tread, one of the purposes of this complementary relationship being to prevent objects from falling between the steps while the escalator is moving, thus preventing an object from jamming the relative up and down movements of the steps and the risk of a serious accident occurring.

Each individual step of an escalator is normally constructed as a carriage provided with four castors. FIG. 1 shows a bottom pair of castors 40 and the axis 45 for the top pair. It appears that each step is able to at least pivot about the top axis 45.

The top and bottom pair of castors each run on rails (not shown in the drawings), the rails for the top pair being set further outwards than those of the bottom pair. For instance on an upward load bearing run the two rails are situated in the same plane but a short distance before the top (and a short distance past the bottom) of the escalator, the rails are so displaced in relation to one another that the inner rail is below the outer rail.

FIG. 1 also shows a triangular supporting member 50, which provides support for the riser and tread. There are a number of these supporting members positioned along the width of the step.

Figure 6A:
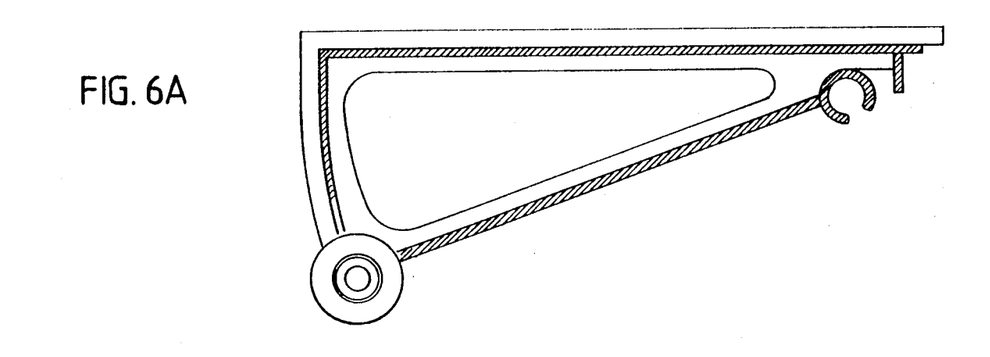
FIG. 6A is a cross-sectional view of an escalator step and shows a supporting member positioned behind the riser.
Figure 6B:
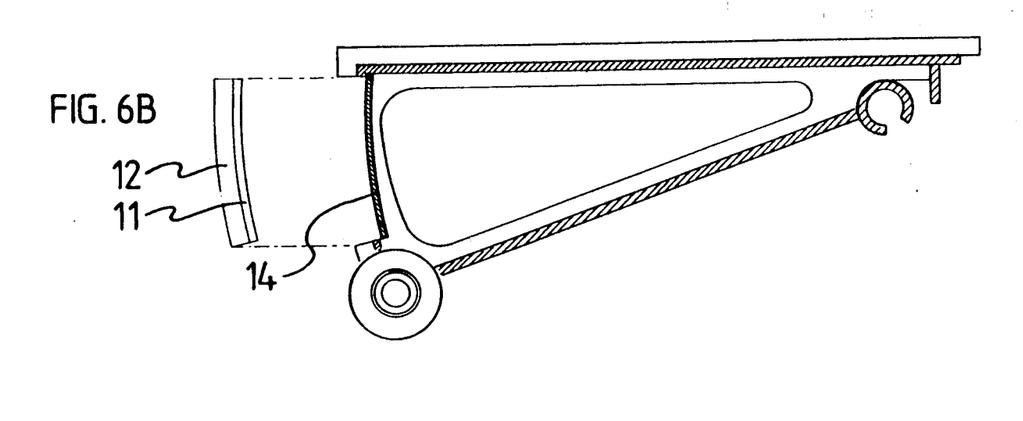
FIG. 6B is a cross sectional view of a preferred escalator step, showing a strengthed backing plate.

It will also be apparent from FIG. 1 that the riser is somewhat curved when viewed in vertical cross section, as in FIGS. 6A and 6B. The curved surface allows the step to rise and fall as required, and this up and down movement is a curved motion pivoting about the top axis 45 rather than a movement in a 90° vertical plane.

Figure 2:
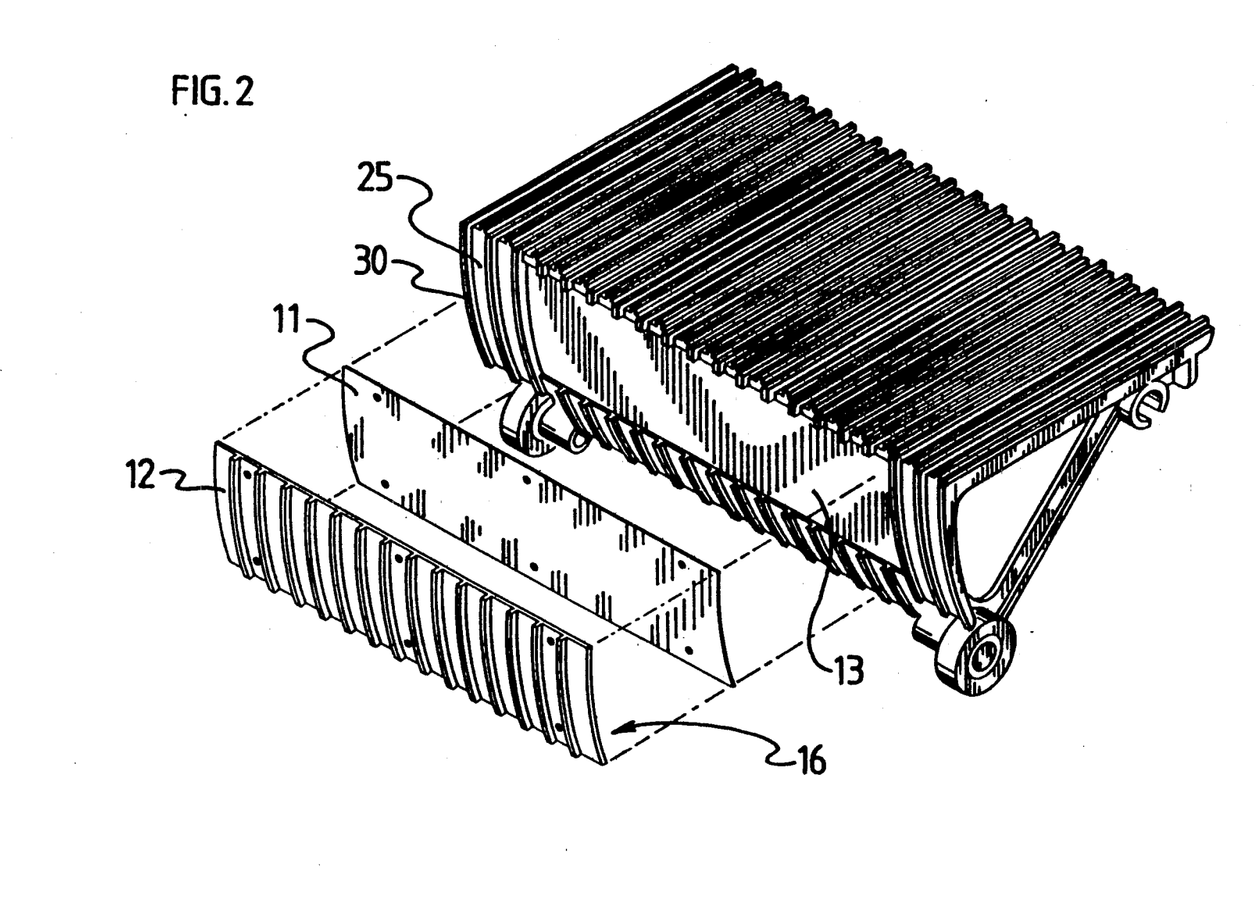
FIG. 2 illustrates a preferred form of the invention, and shows the machined surface of the riser, a sign and a castellated cover plate.

The preferred form of the present invention provides means for advertising using the steps of an escalator. FIG. 2 shows an example of the invention in its most preferred form, utilizing the machined face of the riser to display indicia such as an advertising sign.

FIRST PREFERRED EMBODIMENT

FIG. 2 shows how a sign 11 and cover plate 12 might be attached to the riser 25 of an escalator step. If the riser has a series of castellations, then preferably a number of the ribs 30 are removed so as to provide a backing surface 13 to accommodate the sign. Preferably the backing surface is substantially planar.

What we mean by a substantially planar backing surface is a surface where preferably the ribs have been machined away, preferably providing a recess into which the sign can be placed. Because of the curvature of the riser as mentioned above, it is likely that the machined surface 13 may also be curved.

Even if the riser has no castellations, and it appears that on some escalators they do not, some adaptation by machining or other suitable process may well be necessary to allow placement of the sign and its cover.

Preferably the sign 11 would be supported by the backing surface 13. Preferably the sign would be flexible, so as to accommodate the contour of the backing surface. The sign could be made of plastic or some other appropriate flexible material. Preferably the sign would bear indicia.

Preferably the sign is secured to the riser in such a way that it can also be conveniently detached if necessary. An appropriate method of achieving this would be to preferably secure the sign by way of a detachable cover plate 12. The use of such a cover plate would also be a convenient way of protecting the sign from normal wear and tear either from the movement of the escalator itself or from the escalator passengers. Passengers and pushchairs etc easily scuff the riser surface and if the sign is not protected in some way from this, it will probably deteriorate rapidly. Furthermore children on escalators cannot help but kick such signs and test their removability, hence some form of protection for the sign is most preferable.

Preferably the cover plate 12 would be transparent, preferably with a hard wearing non-scratch surface. We prefer to use a polycarbonate material such as perspex for the cover plate however cover plates made from other suitable materials may also be used. For example, toughened glass or an appropriate resin material may also be suitable for this purpose.

Preferably the cover plate would be attached to the riser by means of an allen key arrangement or some other suitable means of fastening, which would be tamper-proof while the escalator is moving.

Preferably the cover plate would be moulded so as to mimic the existing castellations on the riser, as shown in FIG. 2. It would also be preferable for the shape of the back face 16 of the cover to substantially match the backing surface 13 of the modified riser.

We believe that it would be preferable for the dimensions of the moulded ribs, to vary from the dimensions of the original ribs on the riser. We believe it would be preferable for the moulded ribs to be lightly narrower than the original ribs to prevent or reduce wear on the cover plate by the teeth on the rear of the adjacent step.

Preferably not all the ribs on the riser would be removed. FIG. 2 shows a preferred rib pattern after an area on the riser has been machined. These remaining ribs help prevent objects from falling between the riser and the back edge of the adjacent escalator step. Furthermore the ribs on either side of the sign provide stability for the escalator step, preferably reducing any sloppy sideways movement of the step while the escalator is moving, and acting as a guiding mechanism for entry of the steps under the comb device situated at the top and bottom of the escalator. Furthermore these remaining ribs, by guiding the step in relation to the adjacent step on the escalator, possibly prevent damage to the cover plate and/or sign by the teeth on the rear of the adjacent step.

SECOND PREFERRED EMBODIMENT

In another preferred form, the invention provides a method for modifying the existing steps in an escalator. Preferably this would involve either modifying a replacement step or, while servicing the machine, modifying an existing step. Preferably an area on the riser and/or the tread would be machined and/or replaced to provide a substantially planar recessed surface, preferably leaving a number of surrounding castellations on either side of said planar surface. Preferably the artwork would be prepared and a cover plate made. Preferably the artwork would be placed in to the recess on the riser and/or the tread, or alternatively into a recess in the back of the cover plate. Preferably the sign and cover plate would be attached to the machined step by appropriate fasteners. Preferably the cover plate and sign would be detachable.

THIRD PREFERRED EMBODIMENT

In yet another preferred form, the invention provides a method of manufacturing new steps for a new escalator. Preferably this would involve moulding a new escalator step, preferably having an area of the tread and/or the riser without castellations so as to attach a sign and/or cover plate to the appropriate surface. The escalator step could be manufactured from metal, however it may also be appropriate to mould a new escalator step in part or completely from a transparent or translucent material.

POSSIBLE VARIATIONS OF THE PREFERRED EMBODIMENTS

Clearly the most preferred forms of the invention are merely examples of how an area of an escalator step may be adapted to convey information to passengers on an escalator, or persons standing at the entrance to or exit from an escalator.

The following then are possible variations to what has already been described:

Variations for the riser and tread including using a bevelled surface:

Although the sign is shown in the first preferred embodiment as being placed into a machined recess on the riser, alternatively the sign might be fitted into a recess on the tread or the riser and tread of an escalator step.

Figure 3:
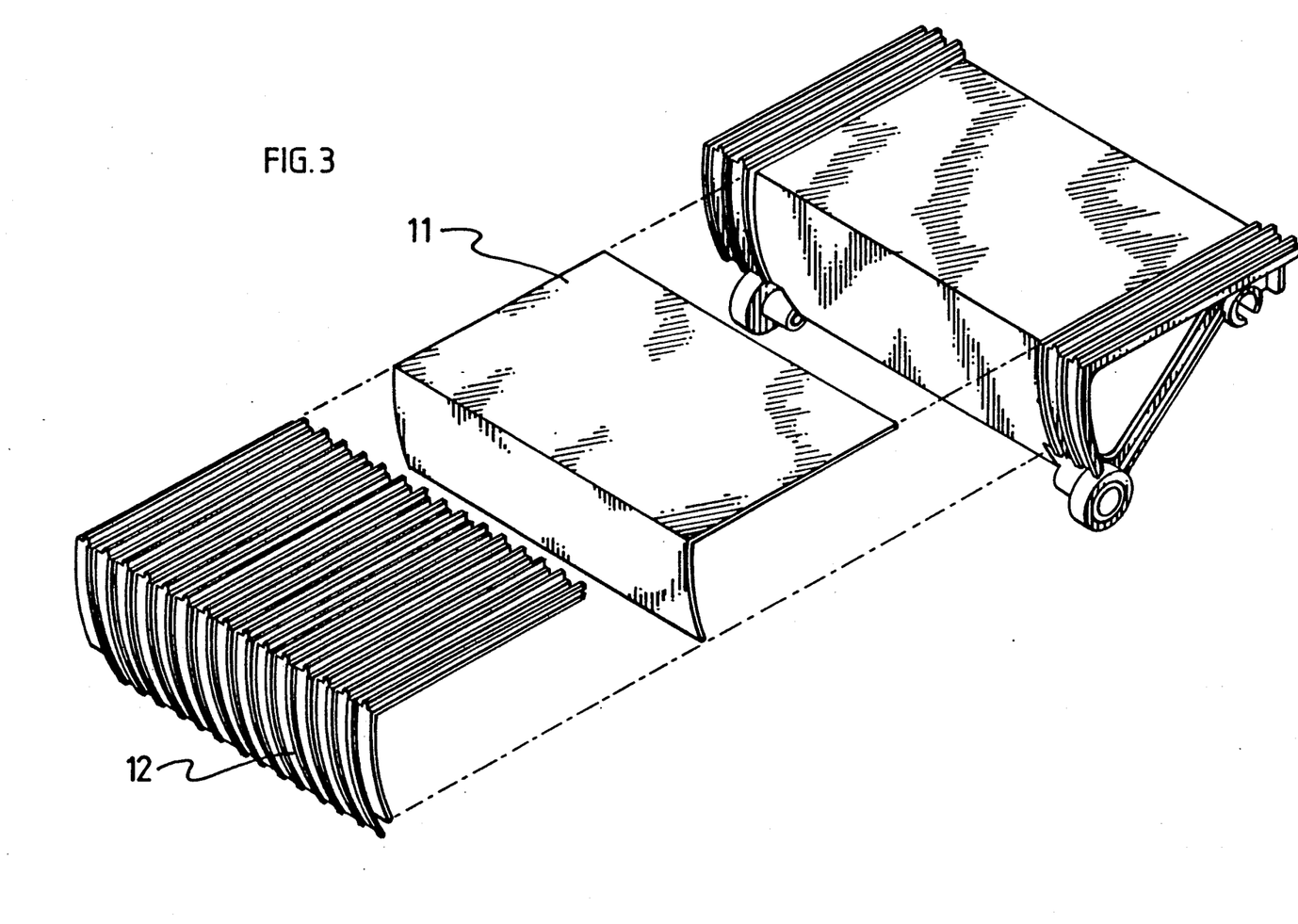
FIG. 3 shows the machined surface of the tread and riser, a sign and a castellated cover plate.

FIG. 3 shows how an area of the tread and riser of an escalator step may be modified, preferably by machining away an area of the castellation pattern so as to allow the fitting of either two separate signs or a sign which can be bent around a corner. In constrast to FIG. 2 it would be preferable to remove the full length of the ribs involved and not part thereof as shown in FIG. 2. This is preferably because it would be more economic and efficient for the teeth on the moulded cover plate to substantially match the moulded rib pattern for each adjacent riser. Preferably the cover plate would be moulded in one piece, although it would also be possible to have a separate riser cover and tread cover if necessary. Preferably the cover(s) would be attached to the step with an allen key arrangement or some other suitable tamper-proof fastening device(s).

It will be apparent that adaptation of the tread alone on an escalator step is an alternative. This would also have direct application to the step of a travelator, which we described earlier as having a tread portion only and not a riser portion.

Figure 4:
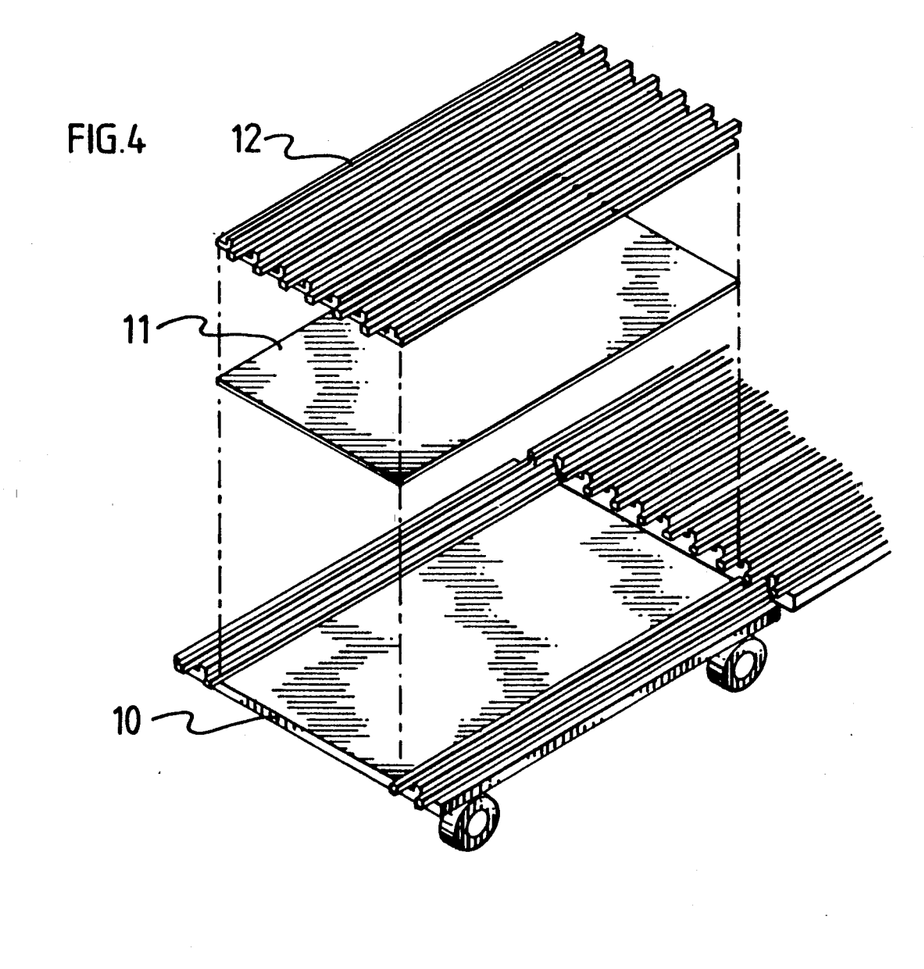
FIG. 4 illustrates a modified step of a travelator.

FIG. 4 shows how an area of the tread of a travelator could be machined so as to allow a sign and preferably a cover plate to be fitted into the machined recess.

Furthermore, because not all escalator steps are of the same width, we believe that it may be preferable to mould cover plates in small sections, preferably about 4 inches wide. This would allow variation of the width of the sign to suit either the width of the particular escalator step or the advertisers requirements, and would possible remove the requirement to mould a set of cover plates for each different width escalator of a given profile.

It would be preferable that adjoining cover plates would meet on a line midway between the partly machined ribs shown on the riser in FIG. 1, or, in the case where those ribs have also been machined away, as shown in FIG. 3, the cover plates would preferably adjoin in line with the corresponding teeth on the back edge of the adjacent step.

Figure 5:
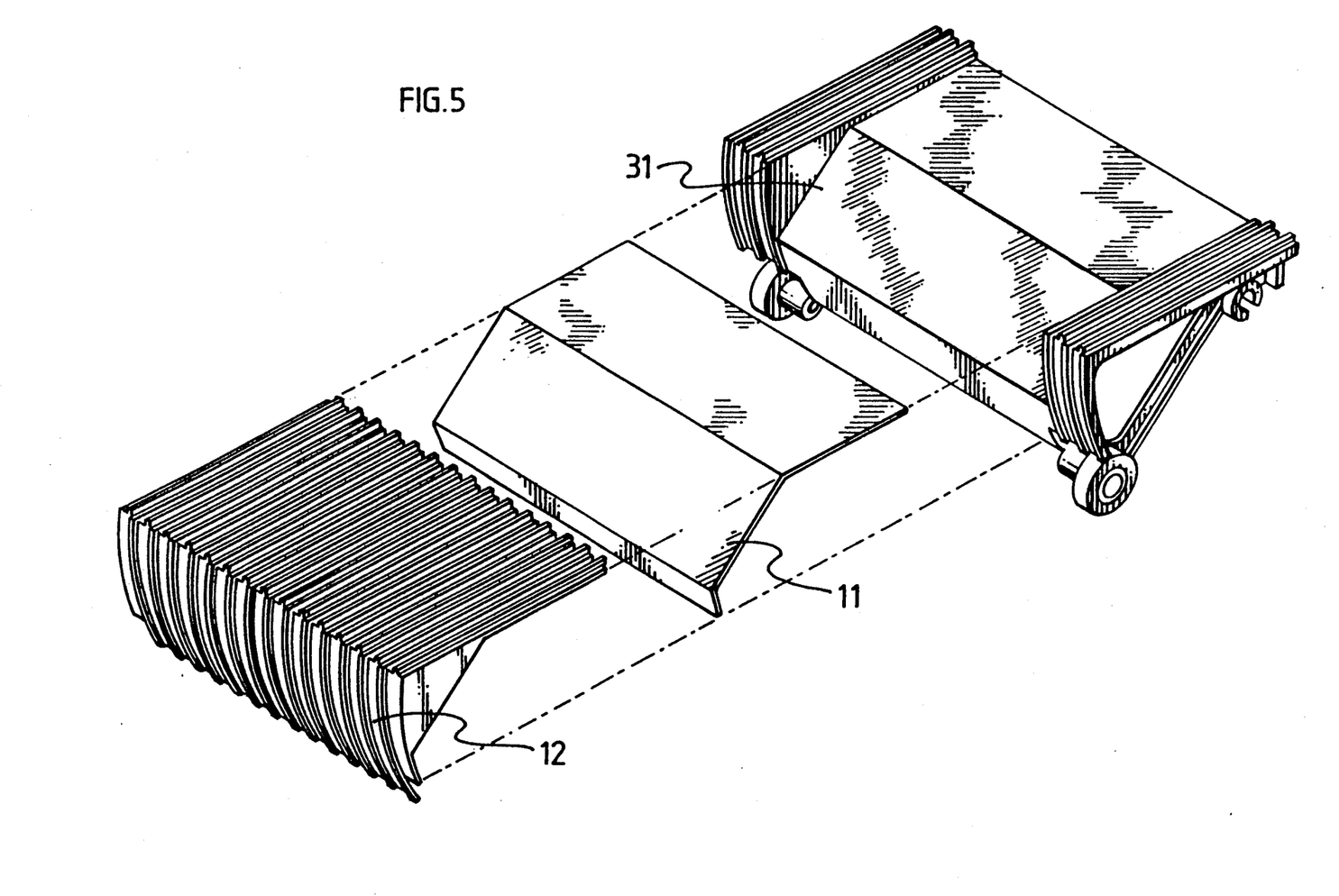
FIG. 5 shows a modified escalator step which has been machined to produce a bevelled surface between the riser and the platform.

FIG. 5 shows an escalator step with a bevelled surface 31 between the riser and the tread. This bevelled surface could be utilised to attach a sign, however this would appear to be less preferable than using the existing riser and tread surfaces. Preferably the cover plate would be manufactured from a moulded transparent or translucent material, probably of a sufficient thickness so as to re-establish the original shape of the step before it was machined.

Variations in fitting the sign:

Other alternatives may include fitting the sign into a recess in the back face 16 of the cover or even permanently securing the sign onto the riser and/or tread perhaps using a transparent resin or some other appropriate material. The tread and/or riser surface would need to be machined so as to allow for the thickness of the resin. This latter method however appears to be less preferable because sealing the sign onto the surface would probably be too permanent and not allow easy access to the sign. Therefore a convenient method of changing the advertising signs is most preferable.

Furthermore the sign 11 may not necessarily be separable from the cover 12 but could form part of the cover itself. For instance, indicia could be incorporated within a moulded cover or inscribed onto the front or back surface of the cover. It would be less preferable for the indicia to be on the front surface of the cover, especially if those markings were exposed to the wear and tear of escalator traffic and movement.

Figure 7:
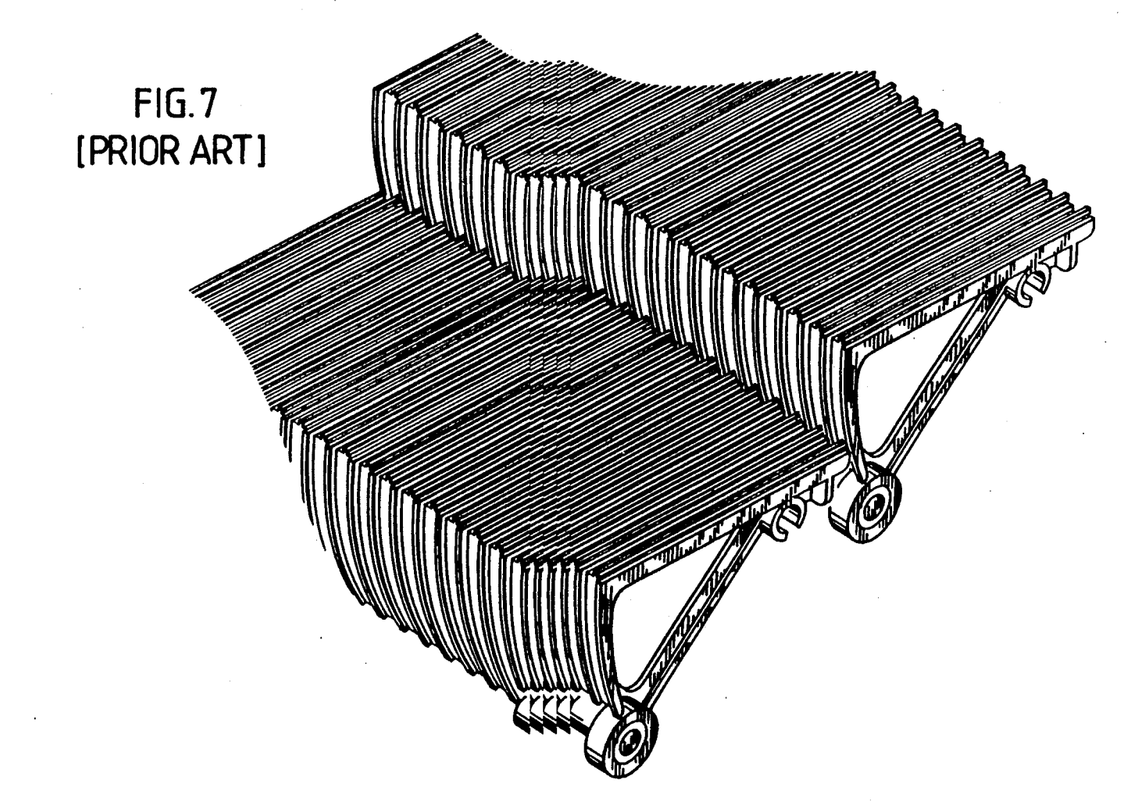
FIG. 7 illustrates the interface between a pair of escalator steps and shows the complementary castellations of each step.
Figure 8:
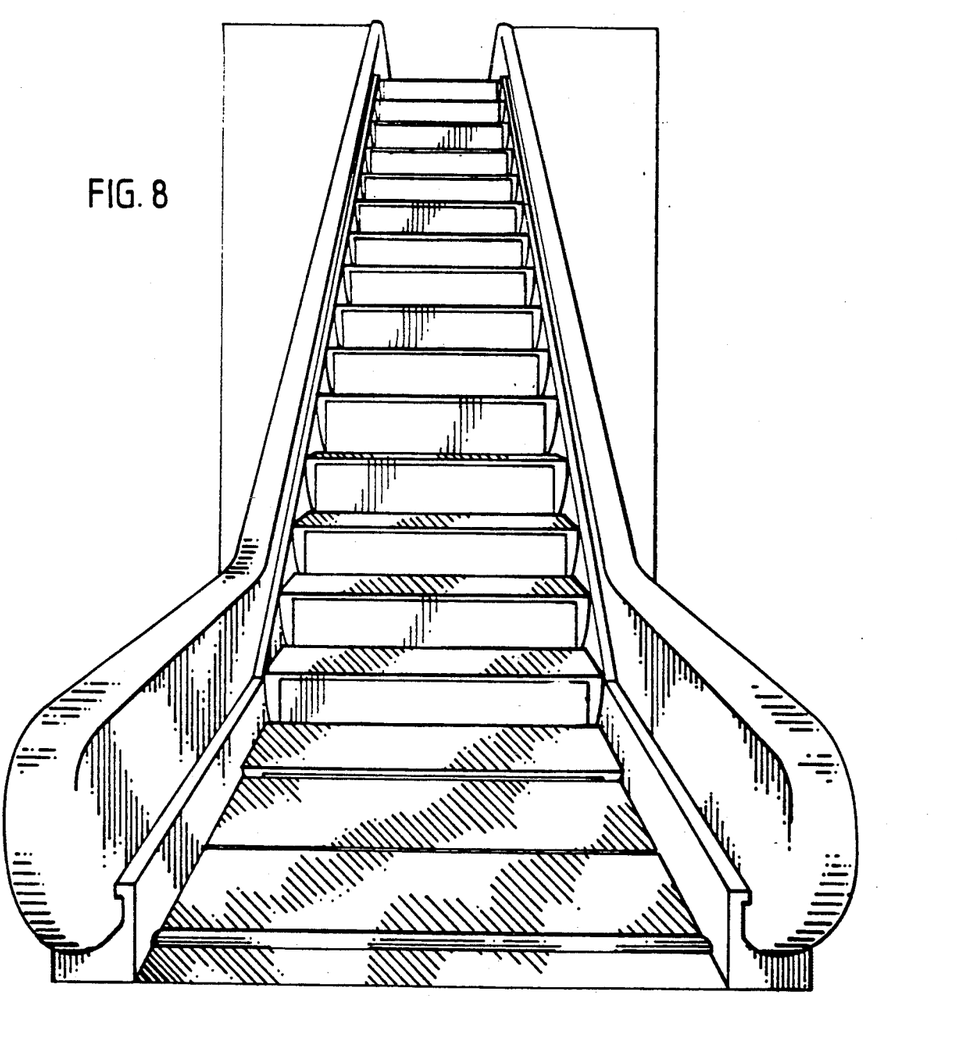
FIG. 8 illustrates an escalator.
Figure 9:
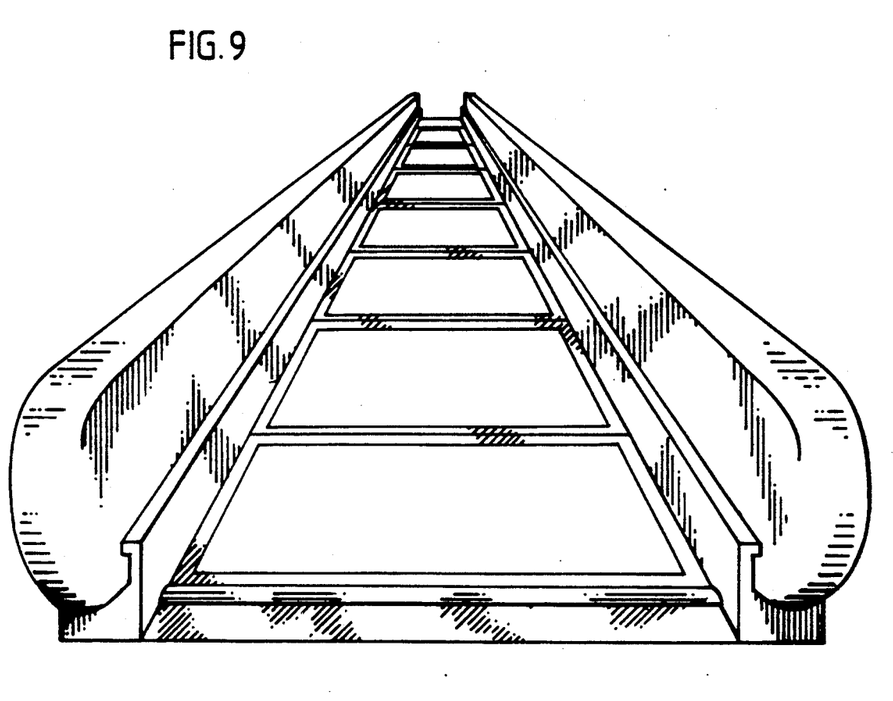
FIG. 9 illustrates a travelator.

Although providing a cover plate which mimics the existing castellations on the riser appears to be more preferable, other alternatives may exist. For instance a cover plate with a flat front surface could be used although it would be preferable to then adapt the catellation pattern or teeth at the back edge of the adjacent step so as to complement the shape of the cover plate, thereby also preventing objects from falling in between the sign and the neighbouring step. FIG. 7 illustrates the complementary castellations and teeth of adjacent steps.

Variations supporting the backing surface:

We have found the thickness of the plate at the base of the ribs to typically be quite thin and therefore if the backing surface needed strengthening, it may be more preferable to completely cut away the backing plate and insert a thicker backing plate to retain strength in the step. FIG. 6A shows a cross-sectional view of a typical escalator step. Normally behind the riser face are a number of tapered struts which provide support for the riser face, tread, and escalator step as a whole. One preferred option then is to remove an area of the riser completely, so as to allow for the insertion of a strengthened backing plate 14, shown in cross-section of FIG. 6B of reasonable thickness onto which the sign would be attached. This strengthened backing plate would preferably be welded on, although other alternative modes of affixing may work just as well.

On an OTIS ® UB escalator step there are usually three supporting struts positioned behind the riser and the tread, and consequently, it is preferred in this case to cut away an area of the riser and the middle strut segment only, thereby leaving the two outer struts intact, and retaining a lot of the existing structural support for the step.

Variations using a light source

Other possible variations would include using apertures in the riser or tread so as to allow illumination of the indicia, for example back-lit or edge-illuminated PERSPEX.

Figure 10:
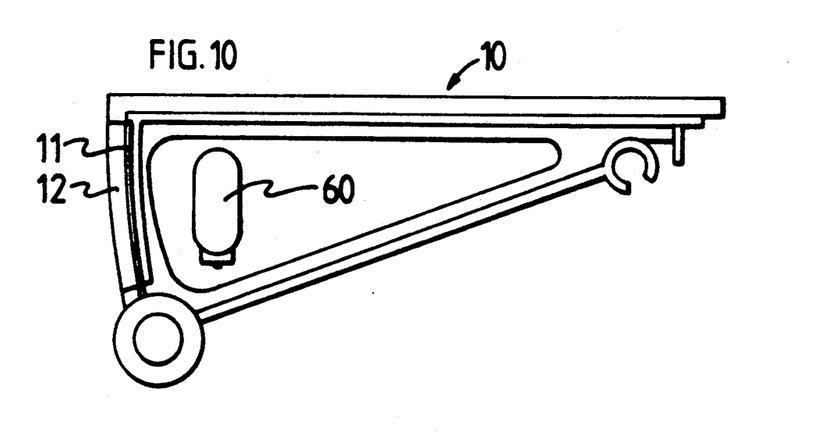
FIG. 10 illustrates an escalator step and light source.

Furthermore there could be a concealed light source 60 in the tread or the riser or even beneath the step, as shown in FIG. 10, if the step was of a transparent or translucent material itself. In that case indicia could be moulded on to the surface of the removable cover plate, and the cover plate could be made from cast aluminium, PERSPEX or some other suitable material, so that the actual surface of the cover provides the message. Nevertheless this appears to be less preferable than using a transparent cover plate which protects the indicia from wear and tear.

Examples of possible light sources could include LEDs, LCDs or other light box messages, either permanent or transient.

ADVANTAGES OF THE PREFERRED EMBODIMENTS

It will be apparent that there are a number of advantages of the preferred embodiments. Firstly these embodiments are of importance to escalator manufacturers and may be employed at the stage of manufacture to produce a new kind of escalator step. Furthermore they may be used to modify existing escalator steps. The latter is of significant advantage to the owners of existing escalators in that it is not necessary to purchase new escalator steps, but instead existing steps can be easily and economically adapted to accommodate advertising signs.

We claim:

1. A passenger conveying device such as an escalator or travelator having a plurality of interacting movable steps,
   each said step having a defined external profile allowing relative movement between adjacent steps,
   wherein at least one of said steps has means for displaying indicia to a passenger on said device,
   said means comprising a cover fixed to said step, said cover having an external profile corresponding to the defined external profile of said steps.

2. A passenger conveying device as claimed in claim 1 wherein said cover is transparent or translucent, and said means for displaying indicia further comprises a sign.

3. An escalator having a plurality of interacting movable steps,
each said step having a defined external profile allowing relative movement between adjacent steps,
wherein at least one of said steps has means for displaying indicia to a passenger on said device,
said means comprising a cover fixed to said step,
said cover having an external profile corresponding to the defined external profile of said steps.

4. A replacement step for a passenger conveying device
said device having a plurality of steps, each step having a defined external profile,
wherein said replacement step is modified to receive indicia displaying means,
said modified step having a substantially flat backing surface onto which a cover is fixed,
said cover having an external profile corresponding to the defined external profile of said steps.

5. A method of modifying a step for a passenger conveying device such as an escalator or travelator comprising the processes of:
machichining away an area on the step to form a substantially flat backing surface,
fitting a sign on to said backing surface,
fixing a cover to said step.

6. A method of manufacturing a new step for a passenger conveying device such as an escalator or travelator comprising the processes of:
moulding a step having a defined external profile,
said external profile having an area which is substantially flat,
fitting a sign to the step,
fixing a cover to the step.

* * * * *

UNITED STATES PATENT AND TRADEMARK OFFICE
CERTIFICATE OF CORRECTION

PATENT NO. : 5,176,239
DATED : January 5, 1993
INVENTOR(S) : Alexander FINDLAY et al.

It is certified that error appears in the above—identified patent and that said Letters Patent is hereby corrected as shown below:

Column 3, line 63, change "lightly" to --slightly--.

Column 4, line 64, change "constrast" to --contrast--.

Column 5, line 22, change "possible" to --possibly--;

lines 65-66, change "catellation" to --castellation--.

Column 8, line 10, (claim 5, line 4), change "machichining" to --machining--.

Signed and Sealed this

Sixth Day of December, 1994

Attest:

BRUCE LEHMAN

Attesting Officer

Commissioner of Patents and Trademarks